United States Patent
Blythe et al.

(10) Patent No.: US 9,611,794 B2
(45) Date of Patent: Apr. 4, 2017

(54) SYSTEMS AND METHODS FOR CONTROLLING EXHAUST GAS RECIRCULATION

(75) Inventors: Neil Xavier Blythe, Lawrence Park, PA (US); Shawn Michael Gallagher, Lawrence Park, PA (US); James Robert Mischler, Lawrence Park, PA (US); Luke Henry, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 963 days.

(21) Appl. No.: 13/562,354

(22) Filed: Jul. 31, 2012

(65) Prior Publication Data

US 2014/0033705 A1    Feb. 6, 2014

(51) Int. Cl.
*F02B 33/44* (2006.01)
*F02D 41/00* (2006.01)
(Continued)

(52) U.S. Cl.
CPC ......... *F02D 41/0065* (2013.01); *F02D 21/08* (2013.01); *F02D 41/0082* (2013.01); *F02D 41/0087* (2013.01); *F02M 26/25* (2016.02); *F02M 26/42* (2016.02); *F02M 26/44* (2016.02); *Y02T 10/47* (2013.01)

(58) Field of Classification Search
CPC ........... F02M 25/0749; F02M 25/0707; F02M 25/0711; F02M 25/0713; F02M 25/0712; Y02T 10/47; F02D 41/0065; F02D 41/005; F02D 41/1446

USPC ...... 60/605.2, 274, 278; 123/568.11, 568.17, 123/568.21; 701/108
See application file for complete search history.

(56) References Cited

U.S. PATENT DOCUMENTS 4,108,114 A * 8/1978 Kosaka et al. .................... 123/3
4,344,393 A   8/1982 Etoh et al.
(Continued)

FOREIGN PATENT DOCUMENTS

CN          1536215 A     10/2004
CN        101048583 A     10/2007
(Continued)

OTHER PUBLICATIONS

International Search Report and Written Opinion issued in connection with corresponding PCT Application No. PCT/US2013/047825 dated Nov. 29, 2013.

*Primary Examiner* — Thomas Denion
*Assistant Examiner* — Thomas Olszewski
(74) *Attorney, Agent, or Firm* — John A. Kramer; Global Patent Operation (57) ABSTRACT

Various systems and method for controlling exhaust gas recirculation (EGR) in an internal combustion engine are provided. In one embodiment, a method includes during a first operating condition, directing exhaust gas from a first cylinder group into an engine air intake stream and directing substantially no exhaust gas from a second cylinder group to the engine air intake stream. The method further includes during a second operating condition, directing exhaust gas from the second cylinder group through a turbocharger bypass into the engine air intake stream and reducing a fuel injection amount of the first cylinder group relative to a fuel injection amount of the second cylinder group.

20 Claims, 5 Drawing Sheets

(51) Int. Cl.

| | | |
|---|---|---|
| *F02D 21/08* | (2006.01) | |
| *F02M 26/25* | (2016.01) | |
| *F02M 26/42* | (2016.01) | |
| *F02M 26/44* | (2016.01) | |

(56) References Cited

U.S. PATENT DOCUMENTS

| | | | |
|---|---|---|---|
| 5,121,734 A | 6/1992 | Grieshaber et al. | |
| 6,918,251 B2* | 7/2005 | Yanagisawa et al. | 60/605.2 |
| 7,143,756 B2* | 12/2006 | Kojima et al. | 123/698 |
| 7,610,757 B2* | 11/2009 | Onodera | 60/605.2 |
| 8,763,394 B2* | 7/2014 | Freund | 60/605.2 |
| 8,831,858 B2* | 9/2014 | Roth | F02D 21/04 |
| | | | 123/568.12 |
| 2008/0178843 A1* | 7/2008 | Duffy et al. | 123/435 |
| 2011/0203558 A1 | 8/2011 | Pappenheimer | |
| 2011/0253113 A1 | 10/2011 | Roth et al. | |
| 2012/0000448 A1 | 1/2012 | Freund et al. | |

FOREIGN PATENT DOCUMENTS

| | | |
|---|---|---|
| CN | 101970845 A | 2/2011 |
| CN | 102072051 A | 5/2011 |
| WO | 9103634 A1 | 3/1991 |
| WO | 2007008196 A1 | 1/2007 |

\* cited by examiner

SYSTEMS AND METHODS FOR CONTROLLING EXHAUST GAS RECIRCULATION

FIELD

Embodiments of the subject matter disclosed herein relate to exhaust gas recirculation (EGR) systems and methods.

BACKGROUND

Some engines utilize recirculation of exhaust gas from an engine exhaust system to an engine intake system, a process referred to as exhaust gas recirculation (EGR), to reduce combustion temperatures and regulated emissions. In some examples, a first group of one or more cylinders provide exhaust gas that is directed through an EGR passage structure coupled between the first group of cylinders and an intake manifold to provide EGR while a second group of one or more cylinders provides substantially no exhaust gas to the EGR passage structure.

BRIEF DESCRIPTION OF THE INVENTION

In embodiments, under some conditions, fuel injection to the first group of cylinders may be reduced or deactivated to increase fuel economy of the engine, but exhaust gas recirculation (EGR) may still be useful for various reasons.

Thus, in one embodiment, a method includes, during a first operating condition, directing exhaust gas from a first cylinder group into an engine air intake stream and directing no exhaust gas from a second cylinder group into the engine air intake stream. The method further includes, during a second operating condition, directing exhaust gas from the second cylinder group through a bypass (e.g., a turbocharger bypass) into the engine air intake stream and reducing a fuel injection amount of the first cylinder group relative to a fuel injection amount of the second cylinder group.

For example, the first operating condition may include an intake pressure being greater than an exhaust pressure and the second operating condition may include the intake pressure being less than the exhaust pressure. By utilizing the differential pressure between the exhaust and the intake to draw exhaust gas from the second cylinder group through the bypass to the engine air intake stream, the fuel injection amount of the first cylinder group can be reduced while still providing EGR. In this way, engine efficiency and fuel economy can be increased.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The present description relates to various embodiments of systems and methods for controlling exhaust gas recirculation (EGR) in an engine having different groups of cylinders that selectively provide EGR. More particularly, the present description relates to controlling EGR during conditions where exhaust pressure is greater than intake pressure. For example, during a low load condition where exhaust pressure is greater than intake pressure, fuel injection for a first cylinder group that generally provides EGR, such as a donor cylinder group, is reduced or shut off in order to reduce fuel consumption. Further, exhaust gas from a second cylinder group is directed through a bypass passage structure fluidly coupled between an exhaust passage structure and an intake passage structure to provide EGR to the cylinders. This approach takes advantage of the reverse pressure differential to drive exhaust gas from the exhaust passage to the intake passage to provide EGR while fueling of the first cylinder group is reduced or shut off. In this way, fuel efficiency is increased while still providing EGR to increase engine efficiency and reduce emissions.

Furthermore, this approach provides an opportunity to regenerate an EGR cooler positioned in an EGR passage structure coupled between the first cylinder group and the intake passage structure without stopping EGR, disrupting other operation modes, or driving other less fuel efficient regeneration methods. For example, during a condition where exhaust pressure is greater than intake pressure, liquid coolant is directed through the EGR cooler and substantially no exhaust gas is directed through the EGR cooler. Instead exhaust gas from the second cylinder group is driven through the bypass between the intake passage structure and the exhaust passage structure to provide EGR. By disabling fuel injection to the first cylinder group, the exhaust gas portion of the EGR cooler can be isolated from exhaust gas while the continued flow of liquid coolant thermally shocks the EGR cooler to remove deposits. In this way, the EGR cooler can be regenerated while still providing EGR. Moreover, during cold ambient or engine conditions, the EGR cooler is bypassed in this manner in order to reduce cooling of intake air and provide hot EGR to heat the cylinders. In this way, the engine is heated more quickly to perform more complete combustion and thereby reduce emissions.

In some embodiments, the engine is configured to be positioned in a vehicle, such as a rail vehicle. The above described methods and configurations are particularly advantageous in a rail vehicle due to the sustained periods of low load operation rail vehicles undergo, for example sitting at idle mode during loading and unloading of cargo, idling in the yard, or other idle operation. In one example, "low-load" operation comprises a mode of operation of the engine where a relatively low amount of work is performed by the engine, for example, low-load operation is less than 50% of maximum engine load. Conversely, a "high-load" operation of the engine comprises a mode of operation where a relatively higher amount of work is performed by the engine, for example operation at greater than 50% of maximum engine load.

Figure 1:
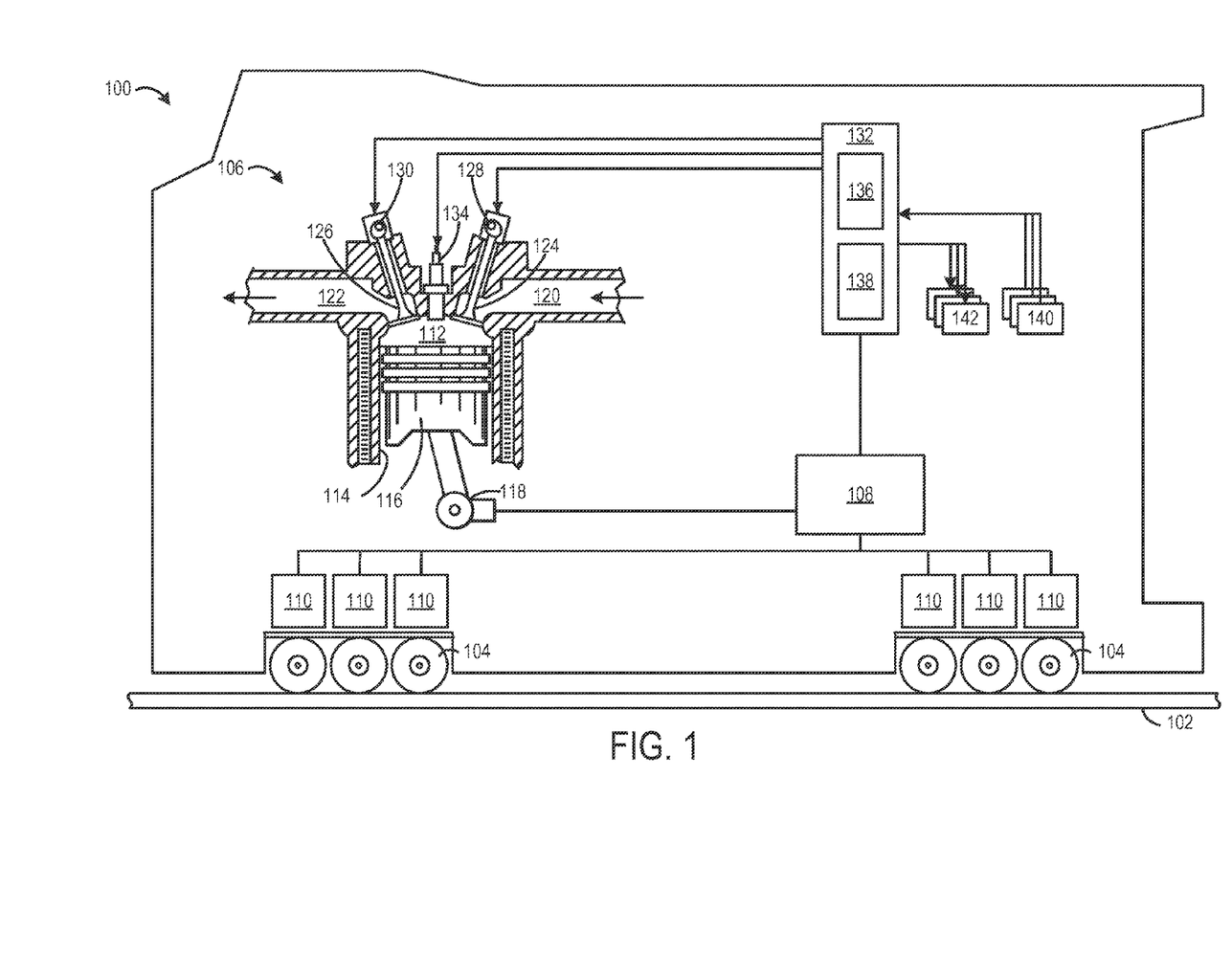
FIG. 1 shows a schematic diagram of a rail vehicle according to an embodiment of the present disclosure.

FIG. 1 schematically shows an embodiment of a vehicle system 100 (e.g., a locomotive system), herein depicted as a rail vehicle, configured to run on a rail 102 using a plurality of wheels 104. The rail vehicle 100 includes an engine system 106. In other non-limiting embodiments, the engine system 106 is a stationary engine system, such as in a power-plant application, and in yet other applications, the engine is used in a ship, on-highway vehicle, off-highway vehicle, or other propulsion system.

In one example, the rail vehicle 100 is a diesel-electric vehicle. For example, the engine system 106 includes a diesel engine that generates a torque output that is transmitted to a generator 108. The generator 108 produces electrical power that is stored and/or applied for subsequent propagation to a variety of downstream electrical components. For example, the generator 108 provides electrical power to a plurality of traction motors 110. As depicted, the plurality of traction motors 110 are each connected to one of a plurality of wheels 104 to provide tractive power to propel the rail vehicle 100. One example rail vehicle configuration includes one traction motor per wheel pair (axle). As depicted herein, six traction motors correspond to each of six pairs of wheels of the rail vehicle.

A combustion chamber (i.e., cylinder) 112 of engine 106 includes combustion chamber walls 114 with a piston 116 positioned therein. The piston 116 is coupled to a crankshaft 118 so that reciprocating motion of the piston is translated into rotational motion of the crankshaft. In some embodiments, the engine 106 is a four-stroke engine in which each of the cylinders fires in a firing order during two revolutions of the crankshaft 118. In other embodiments, the engine 106 is a two-stroke engine in which each of the cylinders fires in a firing order during one revolution of the crankshaft 118.

The combustion chamber 112 receives intake air from an intake passage structure 120 and exhausts combustion gases to an exhaust passage structure 122. The intake passage structure 120 and the exhaust passage structure 122 selectively communicate with the combustion chamber 112 by an intake valve 124 and an exhaust valve 126. In some embodiments, the combustion chamber 112 includes two or more intake valves and/or two or more exhaust valves.

In this example, the intake valve 124 and exhaust valve 126 are controlled by cam actuation systems 128 and 130, respectively. Cam actuation systems 128 and 130 each include one or more camshafts and utilize one or more of cam profile switching (CPS), variable cam timing (VCT), variable valve timing (VVT) and/or variable valve lift (VVL) systems that are operable by a controller 132 to vary valve operation.

A fuel injector 134 is shown coupled directly to cylinder 112 for injecting fuel directly therein. In this manner, fuel injector 134 provides what is known as direct injection of a fuel into combustion cylinder 112. In one example, the fuel is diesel fuel that is combusted in the engine through compression ignition. In other non-limiting embodiments, the fuel includes natural gas, and/or gasoline, kerosene, biodiesel, or other petroleum distillates of similar density, that are combusted in the engine through compression ignition (and/or spark ignition).

The controller 132 at least partially controls operation of the vehicle system 100 and the engine 106. The controller 132 includes a microprocessor unit (e.g., a processor) 136 and an electronic storage medium (a.k.a., a computer-readable storage medium) 138. For example, the computer-readable storage medium includes one or more of a read-only memory chip, random access memory, etc. The computer readable storage medium 138 holds instructions that when executed by the microprocessor unit 136 executes programs for controlling operation of the engine 106 as well as methods discussed in further detail below with reference to FIGS. 4 and 5.

The controller 132, while overseeing control and management of the vehicle system 100, is configured to receive signals from a variety of engine sensors 140 in order to determine operating parameters and operating conditions, and correspondingly adjust various engine actuators 142 to control operation of the vehicle system 100. For example, the controller 132 receives sensor signals indicative of air-fuel ratio, engine speed, engine load, engine temperature, ambient temperature, intake manifold temperature, exhaust temperature, intake manifold pressure (boost pressure), exhaust pressure, ambient altitude, intake manifold oxygen concentration, etc. For example, the controller 132 adjusts actuators including fuel injectors, intake and exhaust valves, EGR valves, turbocharger bypass valves, flow valves, etc.

In some embodiments, the controller 132 controls a frequency and/or duration of fuel injection individually for each fuel injector 134 of the engine 106. For example, under some conditions, an amount of fuel injected into cylinders of a first cylinder group is different than an amount of fuel injected into cylinders of a second cylinder group.

As described above, FIG. 1 shows only one cylinder of a multi-cylinder engine, however, each cylinder similarly includes its own set of intake/exhaust valves, fuel injector, etc.

Figure 2:
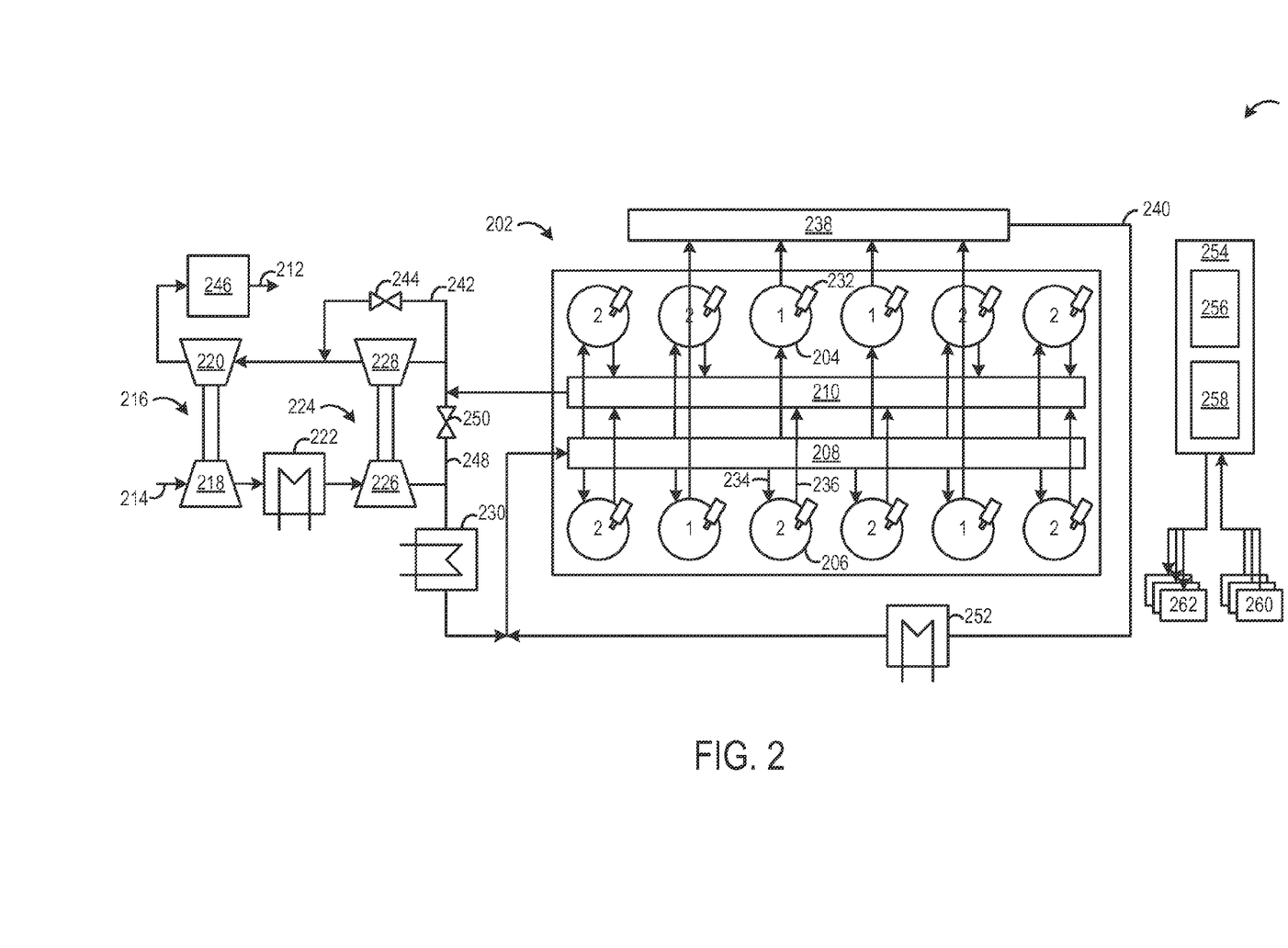
FIG. 2 shows a schematic diagram of an engine according to an embodiment of the present disclosure.

FIG. 2 schematically shows an embodiment of an engine system 200 including a plurality of cylinders 202. The plurality of cylinders 202 is organized into a first cylinder group 204 and a second cylinder group 206. Note that "first" and "second" are labels to denote the cylinders of the first and second cylinder groups, respectively. In one example, the engine system 200 is implemented in a vehicle, such as the vehicle system 100 shown in FIG. 1.

The first cylinder group 204 provides exhaust gas that is directed to an intake manifold 208 of the engine system 200. The intake manifold refers to a passage structure or passages that link to cylinder input ports for providing intake air to the cylinders. In the illustrated embodiment, the first cylinder group 204 provides exhaust gas exclusively to the intake manifold 208. In other words, the first cylinder group 204 is not coupled to an exhaust manifold 210, and further is not directly fluidly coupled to an exhaust passage structure 212 that expels exhaust gas to the atmosphere.

The second cylinder group 206 is coupled to the exhaust manifold 210. Under some conditions, the second cylinder group 206 provides exhaust gas that is directed through the exhaust passage structure 212 and expelled to the atmosphere. Under some conditions, the second cylinder group 206 provides exhaust gas that is directed through a bypass passage structure 248 to the intake manifold 208. In other words, in the illustrated embodiment, the first cylinder group provides exhaust gas merely for EGR and the second cylinder group selectively provides exhaust gas for EGR or to be expelled to the atmosphere. In some embodiments, the first cylinder group is exclusive of the second cylinder group. "Exclusive" means that no cylinder of the first cylinder group is included in the second cylinder group. In the illustrated embodiment, the engine 200 is a V-12 engine having twelve cylinders. In other examples, the engine is a V-6, V-8, V-10, V-16, I-4, I-6, I-8, opposed 4, or another engine type. It will be appreciated that each of the cylinder groups includes a suitable number of cylinders. Furthermore, in some examples, the engine system includes a suitable number of cylinder groups.

The intake manifold 208 couples to the first cylinder group 204 and the second cylinder group 206. An intake passage structure 214 is coupled to the intake manifold 208 to supply fresh air to the intake manifold 208 for combustion. A staged or series turbocharger setup including a first turbocharger 216 and a second turbocharger 224 is positioned in the intake passage structure 214 to compress intake air. The first turbocharger 216 includes a first compressor 218 positioned in the intake passage structure 214 and a first turbine 220 positioned in the exhaust passage structure 212. The first turbine 220 is driven at least partially by exhaust gas provided by the second cylinder group 206 through the exhaust manifold 210. A first liquid-cooled charge air cooler 222 is positioned in the intake passage structure 214 downstream of the first compressor 218. The second turbocharger 224 includes a second compressor 226 positioned in the intake passage structure 214 downstream of the first cooler 222 and a second turbine 228 positioned in the exhaust passage structure 212 upstream of the first turbine 220. The second turbine 228 is driven at least partially by exhaust gas provided by the second cylinder group 206 through the exhaust manifold 210. A second liquid-cooled charge air cooler 230 is positioned in the intake passage structure 214 downstream of the second compressor 226.

In the illustrated implementation, the engine system 200 does not include a throttle valve positioned in the intake passage structure 214. However, in some implementations, the intake passage structure 120 includes a throttle valve positioned downstream of the second compressor 226.

Each of the plurality of cylinders 202 includes a fuel injector 232 operable to inject fuel into that cylinder, at least one intake port 234 that is operable to receive combustion air from the intake manifold 208, and at least one exhaust port 236 that is operable to exhaust gas to an exhaust manifold. An exhaust manifold (a.k.a., an EGR manifold) 238 is coupled to the first cylinder group 204 to receive exhaust gas from the first cylinder group. In the illustrated embodiment, the EGR manifold 238 is not coupled to the second cylinder group 206. An EGR passage structure 240 is coupled between the EGR manifold 238 and the intake passage structure 214. Under some conditions, exhaust gas provided by the first cylinder group 204 flows through the EGR passage structure 240 into the intake passage structure 214, where it mixes with fresh intake air and the mixture is provided to the plurality of cylinders 202 through the intake manifold 208 for combustion. In the illustrated embodiment, the EGR passage structure 240 is not coupled to the exhaust manifold 210. A liquid-cooled EGR cooler 252 is positioned in the EGR passage structure 240 to cool exhaust gas before the exhaust gas is circulated to the intake manifold 208.

The exhaust manifold 210 is coupled to the second cylinder group 206 to receive exhaust gas from the second cylinder group. In the illustrated embodiment, the exhaust manifold 210 is not coupled to the first cylinder group 204. Under some conditions, exhaust gas provided by the second cylinder group 206 travels from the exhaust manifold 210, through the second turbine 228 of the second turbocharger 224, through the first turbine 220 of the first turbocharger 216 to be expelled from the exhaust passage structure 212 into the atmosphere. Under some conditions, the exhaust gas bypasses the second turbine 228 through an exhaust bypass passage structure 242. An exhaust bypass valve 244 is positioned in the exhaust bypass passage structure 242. The exhaust bypass valve 244 is operable to control flow of exhaust gas through the exhaust bypass passage structure 242. For example, the bypass valve 244 is adjusted to bypass the second turbine 228 to lower boost pressure under some conditions.

An exhaust gas treatment system 246 is provided in the exhaust passage structure 212, downstream of the first turbine 220. The exhaust gas treatment system 246 treats exhaust gas before it is released to the atmosphere. For example, the exhaust gas treatment system includes a selective catalytic reduction (SCR) system, a diesel oxidation catalyst (DOC), a diesel particulate filter (DPF), various other emission control devices, or combinations thereof.

A bypass passage structure 248 is coupled between the exhaust passage structure 212 and the intake passage structure 214. More particularly, the bypass passage structure 248 is positioned between a point in the exhaust passage structure 212 upstream of the second turbine 228 and downstream of the exhaust manifold 210 and a point in the intake passage structure 214 downstream of the second compressor 226 and upstream of the second cooler 230. Under some conditions, exhaust gas provided by the second cylinder group flows from the exhaust passage structure 212, through the bypass passage structure 248, to the intake passage structure 214 to provide EGR to the plurality of cylinders 202. Furthermore, under some conditions, intake air flows from the intake passage structure 214, through the bypass passage structure 248, and to the exhaust passage structure 212 to accelerate the turbines of the turbochargers. A bypass valve 250 is positioned in the bypass passage structure to control flow of exhaust gas or intake air through the bypass passage structure 248.

A controller 254 includes a processor 256 and computer-readable medium 258 having non-transient instructions that when executed by the processor 256 execute control routines to control the engine 200 and more particularly control EGR during various operating conditions. The controller 254 receives signals from a variety of engine sensors 260 in order to determine operating parameters and operating conditions, and correspondingly adjusts various engine actuators 262.

In one example, the controller 254 is responsive to an intake pressure being less than an exhaust pressure. In particular, in at least some modes of operation, if the intake pressure is less than the exhaust pressure, the controller 252 is configured to control/adjust the bypass valve 250 to direct exhaust gas from the second cylinder group 206 through the bypass passage structure 248 to the intake passage structure 214, and to reduce a fuel injection amount of the first cylinder group 204 relative to a fuel injection amount of the second cylinder group 206. For example, the exhaust pressure is a pressure determined at a point in the exhaust passage structure 212 upstream of the second turbine 228 and the intake pressure is a pressure determined at a point in the intake passage structure 214 downstream of the second compressor 226. In some implementations, reducing the fuel injection amount of the first cylinder group includes injecting substantially no fuel into at least one cylinder of the first cylinder group. In other words, one or more cylinders of the cylinder group are deactivated in order to reduce fuel consumption. In one example, substantially no fuel includes a range of 0-10% of a total fuel injection amount capability of the fuel injector. For example, the controller 254 determines the fuel injection amount/number of cylinders to deactivate based on engine load, or another operating parameter. The approach employed by the controller reduces the energy to drive EGR at low loads by taking advantage of the naturally occurring reverse differential pressure between the exhaust and intake manifolds, thus improving the overall duty cycle, engine efficiency, and fuel economy of the engine. Moreover, exhaust gas treatment system 246 increases the backpressure in the exhaust passage that promotes the flow of exhaust gas from the exhaust passage to the intake passage.

Furthermore, in one example, the controller 254 is operable responsive to the intake pressure being greater than the exhaust pressure. In particular, in at least some modes of operation, if the intake pressure is greater than the exhaust pressure, the controller is configured to direct exhaust gas from the first cylinder group 204 through the EGR passage structure 240 to the intake passage structure 214, and to adjust the bypass valve 250 to direct substantially no exhaust gas from the second cylinder group 206 to the intake passage structure 214. In one example, substantially no exhaust gas includes a range of 0-10% of total EGR capability of the second cylinder group. For example, under conditions other than low load (e.g., engine speed becomes greater than a threshold load value ranging between 200-1200 RPM) where intake pressure is greater than exhaust pressure, both cylinder groups are operating to meet engine load, and the first cylinder group provides exhaust gas for EGR while the second cylinder group provides substantially no exhaust gas for EGR.

Furthermore, in one example, the controller 254 is operable responsive to an intake pressure being less than an exhaust pressure, to direct liquid coolant through the EGR cooler 252 while directing substantially no exhaust gas through the EGR cooler 252. In one example, substantially no exhaust gas includes a range of 0-10% of total EGR capability of the first cylinder group. EGR cooler fouling is often increased or associated with low load operation due to overcooling of already low temperature exhaust gas, as well as carryover of hydrocarbons which condense on the EGR cooler surfaces and deposit as a hard varnish. By bypassing the EGR cooler during low load operation when the intake pressure is less than the exhaust pressure, fouling of the EGR cooler is mitigated. Moreover, regeneration of the EGR cooler is promoted by isolating the EGR cooler from the exhaust, while simultaneously maintaining cooling liquid coolant flow to thermally shock the EGR cooler.

Furthermore, the controller 254 is operable, during an operating condition, to adjust the bypass valve 248 to direct intake air from the intake passage structure 214 through the bypass passage structure 248 to the exhaust passage structure 212 to accelerate the turbochargers 216 and 224. In one example, the operating condition includes a part load condition (e.g., where an engine speed is between a first threshold load value ranging between 500-1400 RPM and a second threshold load value ranging between 1000-2500 RPM) where the turbochargers could be accelerated to increase boost while still meeting intake air flow demands. In another example, the operating condition includes a transient condition where a change in commanded engine output is greater than a threshold output value (e.g., the threshold output value ranges from a 50-100% increase). By directing at least some intake air through the bypass valve 250 such that the intake air bypasses the cylinders and flows directly to the exhaust passage structure and the turbines of the turbochargers, the speed of the turbochargers is increased to increase the operating efficiency of the engine.

Note that in the illustrated embodiment the bypass passage structure 248 is positioned upstream of the second cooler 230. As such, compressed intake air is passed through the bypass passage structure to the turbines without being cooled by the second cooler. By not cooling the compressed intake air with the second cooler, the intake air has better flow characteristics through the turbines to increase the turbocharger speed more quickly relative to compressed intake air that is cooled by the second cooler. Although it will be appreciated that in some embodiments, the bypass passage structure is positioned downstream of the second cooler.

Figure 3:
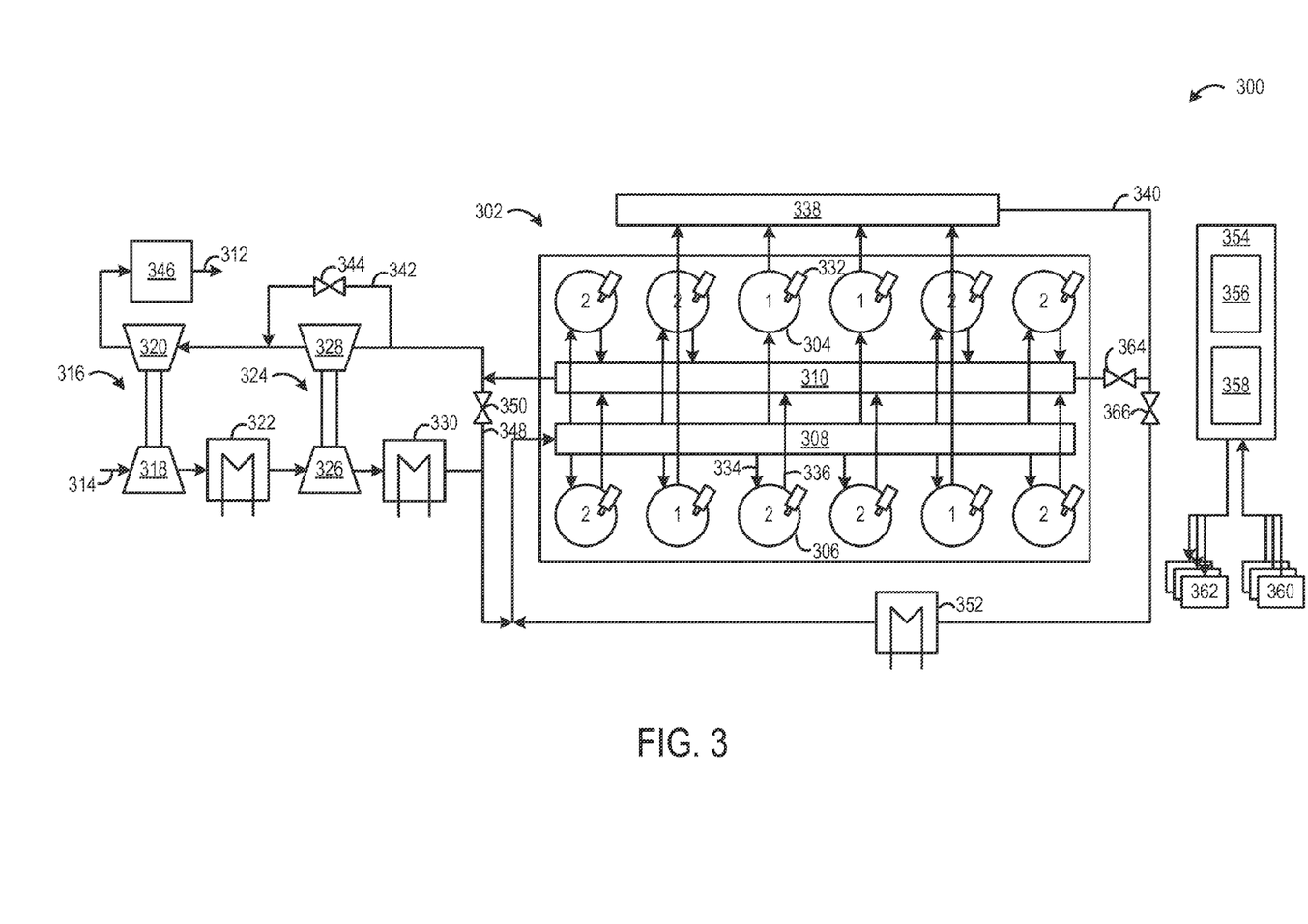
FIG. 3 shows a schematic diagram of another engine according to an embodiment of the present disclosure.

FIG. 3 schematically shows another embodiment of an engine system 300. Components of the engine system 300 that are substantially the same as those of the engine system 200 are identified in the same way and are described no further. However, it will be noted that components identified in the same way in different embodiments of the present disclosure can be at least partly different.

The engine system 300 includes additional valves in the EGR passage structure that allow the first cylinder group to selectively provide exhaust gas to the exhaust manifold. In other words, in the illustrated embodiment the first cylinder group can provide exhaust gas for EGR and/or to the exhaust passage structure. In particular, the EGR passage structure 340 is selectively fluidly coupled to the exhaust manifold 310. An EGR bypass valve 364 is positioned in the EGR passage structure 340. The EGR bypass valve 364 is operable to control the flow of exhaust gas from the first cylinder group 304 through the EGR passage structure 340 to the exhaust manifold 310 and exhaust passage structure 312.

An EGR flow valve 366 is positioned in the EGR passage structure 340 between EGR manifold 338 and the EGR cooler 352. The EGR flow valve 366 is operable to control EGR flow through the EGR passage structure to the EGR cooler 352. The EGR bypass valve 364 and the EGR flow valve 366 are cooperatively controlled by the controller 354 to direct exhaust gas flow from the first cylinder group 304 based on operating conditions.

In one example, the controller 354 is operable, during a first operating condition, to close the EGR bypass valve 364 and open the EGR flow valve 366 to direct exhaust gas from the first cylinder group 304 to the intake passage structure 314 to provide EGR. For example, the first operating condition includes the intake pressure being greater than the exhaust pressure. In another example, the first operating condition includes the engine operating at a load greater than low load (e.g., engine speed being greater than a threshold load value ranging from 200-1200 RPM).

Furthermore, in one example, the controller 354 is operable, during a second operating condition, to open the EGR bypass valve 364 and close the EGR flow valve 366 to direct exhaust gas from the first cylinder group 304 to the exhaust manifold 310. For example, the second operating condition includes the exhaust pressure being greater than the intake pressure. In another example, the second operating condition includes operating at low load (e.g., engine speed being less than a threshold load value ranging from 200-1200 RPM). In yet another example, the second operating condition includes low temperature conditions (e.g., an engine temperature or an ambient temperature being less than a threshold temperature value ranging from an engine temperature of 70-90° C. or a threshold temperature value ranging from an ambient temperature of −20-20° C.). Under some conditions, the exhaust gas from the first cylinder group is directed to the exhaust manifold and further through the bypass passage structure to provide EGR that bypasses the EGR cooler. In other words, the EGR bypass valve 364 and the bypass valve 350 are both open. Under some conditions, the exhaust gas from the first cylinder group is direct to the exhaust manifold and further through the exhaust passage to be expelled to the atmosphere. In other words, the EGR bypass valve 364 is open and the bypass valve 350 is closed.

In the illustrated embodiment, the bypass passage structure 348 is positioned downstream of the second cooler 330. As such, hot exhaust gas is passed through the bypass passage to the intake passage without being cooled by the second cooler. By not cooling the exhaust gas with the second cooler, the exhaust gas heats the cylinder more quickly relative to EGR that is cooled by the second cooler. Although it will be appreciated that in some embodiments, the bypass passage structure is positioned upstream of the second cooler.

Furthermore, in one example, the controller 354 is operable, during a third operating condition, to adjust the EGR bypass valve 364 and adjust the EGR flow valve 366 to direct at least some exhaust gas to from the first cylinder group 304 to the exhaust manifold 310 and through the EGR passage structure. For example, the third condition includes controlling an EGR rate to a target EGR rate.

Figure 4:
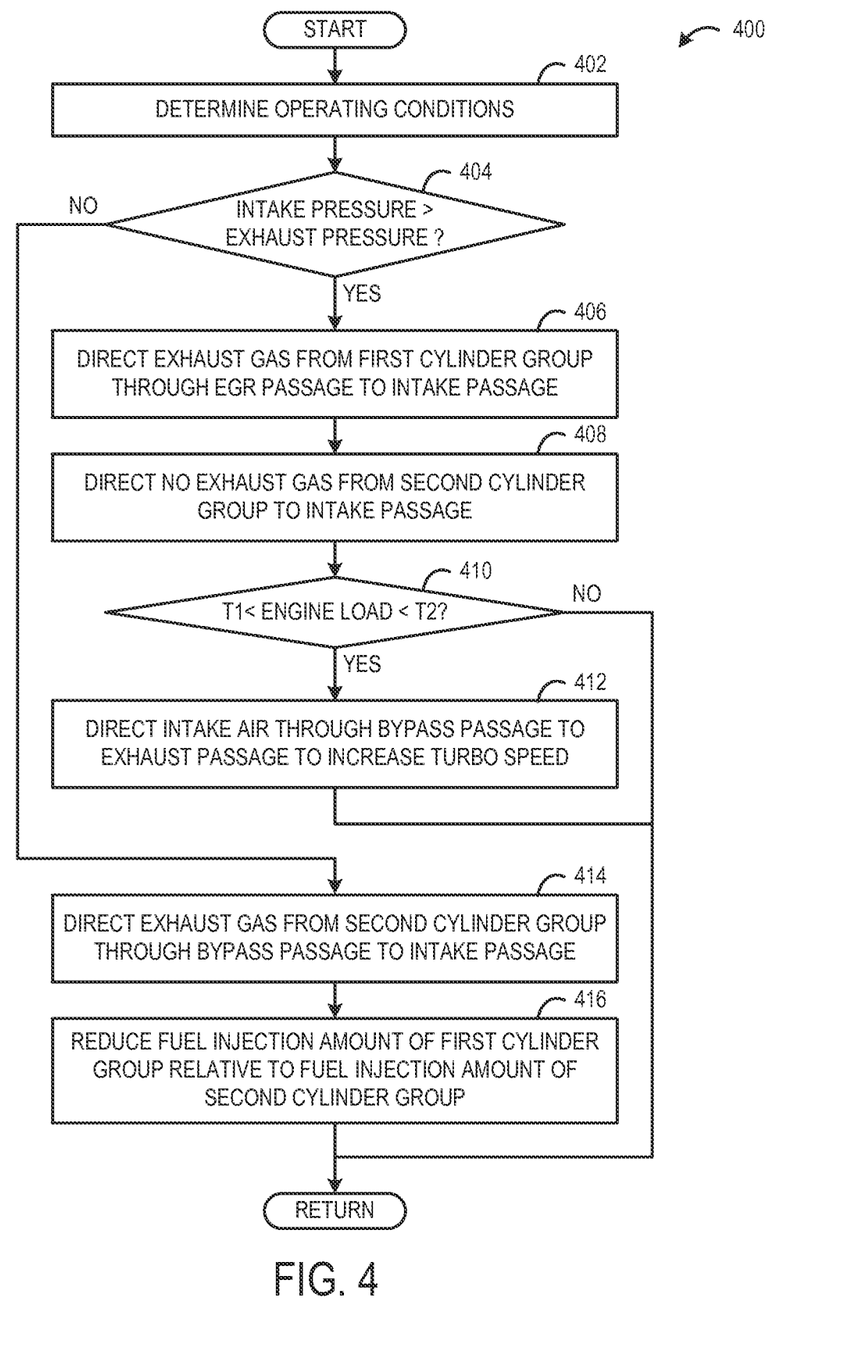
FIG. 4 shows a flow chart of an embodiment of a method for controlling EGR in an engine.

FIG. 4 shows a flow chart of an embodiment of a method 400 for controlling EGR in an engine. In one example, the method 400 is executed by the controller 132 in FIG. 1, the controller 254 in FIG. 2, or the controller 354 in FIG. 3. At 402, the method 400 includes determining operating conditions. In one example, operating conditions are determined based on operating parameters indicative of sensor signals received from sensors coupled to the engine, such as intake pressure, exhaust pressure, engine temperature, ambient temperature, air-fuel ratio, engine speed, engine load, exhaust temperature, exhaust pressure, ambient pressure, ambient altitude, etc.

At 404, the method 400 includes determining whether intake pressure is greater than exhaust pressure. If intake pressure is greater than exhaust pressure, then the method 400 moves to 406. Otherwise, the method 400 moves to 410.

At 406, the method 400 includes directing exhaust gas from a first cylinder group into an engine air intake stream. In one example, the exhaust gas from the first cylinder group is directed through an EGR passage structure fluidly coupled between the first cylinder group and an intake passage structure.

At 408, the method 400 includes directing substantially no exhaust gas from a second cylinder group into the intake passage structure or the engine air intake stream. For example, the second cylinder group provides exhaust gas to the exhaust manifold to be expelled to the atmosphere. In one example, the first cylinder group provides exhaust gas for EGR and the second cylinder group provides no exhaust gas for EGR (e.g., bypass valve 350 closed).

At 410, the method 400 includes determining whether engine load is greater than a first threshold load value and less than a second threshold load value. For example, the engine load is in a part load range where the first threshold load value is between 500-1400 RPM and the second threshold load value is between 1000-2500 RPM. As another example, the threshold load values may be 500 and 2500 hp. If the engine load is greater than the first threshold load value and less than the second threshold load value in the part load range, then the method 400 moves to 412. Otherwise the method 400 returns to other operations.

At 412, the method 400 includes directing intake air from the intake passage structure through the bypass passage structure to the exhaust passage structure to accelerate the turbocharger. By accelerating the turbocharger in the part load range, boost pressure is increased beyond what otherwise would be provided while still providing suitable intake air to the cylinders for combustion. In this way, engine efficiency is increased. In some implementations, this step may be performed during other operating conditions, such as during transients.

At 414, the method 400 includes directing exhaust gas from the second cylinder group through a bypass passage structure fluidly coupled between the exhaust passage structure and the intake passage structure.

At 416, the method 400 includes reducing a fuel injection amount of the first cylinder group relative to a fuel injection amount of the second cylinder group. In one example, reducing the fuel injection amount of the first cylinder group includes injecting substantially no fuel into at least one cylinder of the first cylinder group. In another example, reducing the fuel injection amount of the first cylinder group includes injection substantially no fuel into all cylinders of the first cylinder group.

The fuel injection amount of the first cylinder group is reduced to increase fuel economy of the engine. Because the fuel injection amount of the first cylinder group is reduced, the effective EGR rate provided by the first cylinder group is correspondingly reduced. Accordingly, exhaust gas provided by the second cylinder group is driven through the bypass passage structure for EGR by the reversal in pressure differential between the intake and the exhaust. In this way, fuel economy is increased while still providing EGR to increase engine efficiency and reduce emissions.

Figure 5:
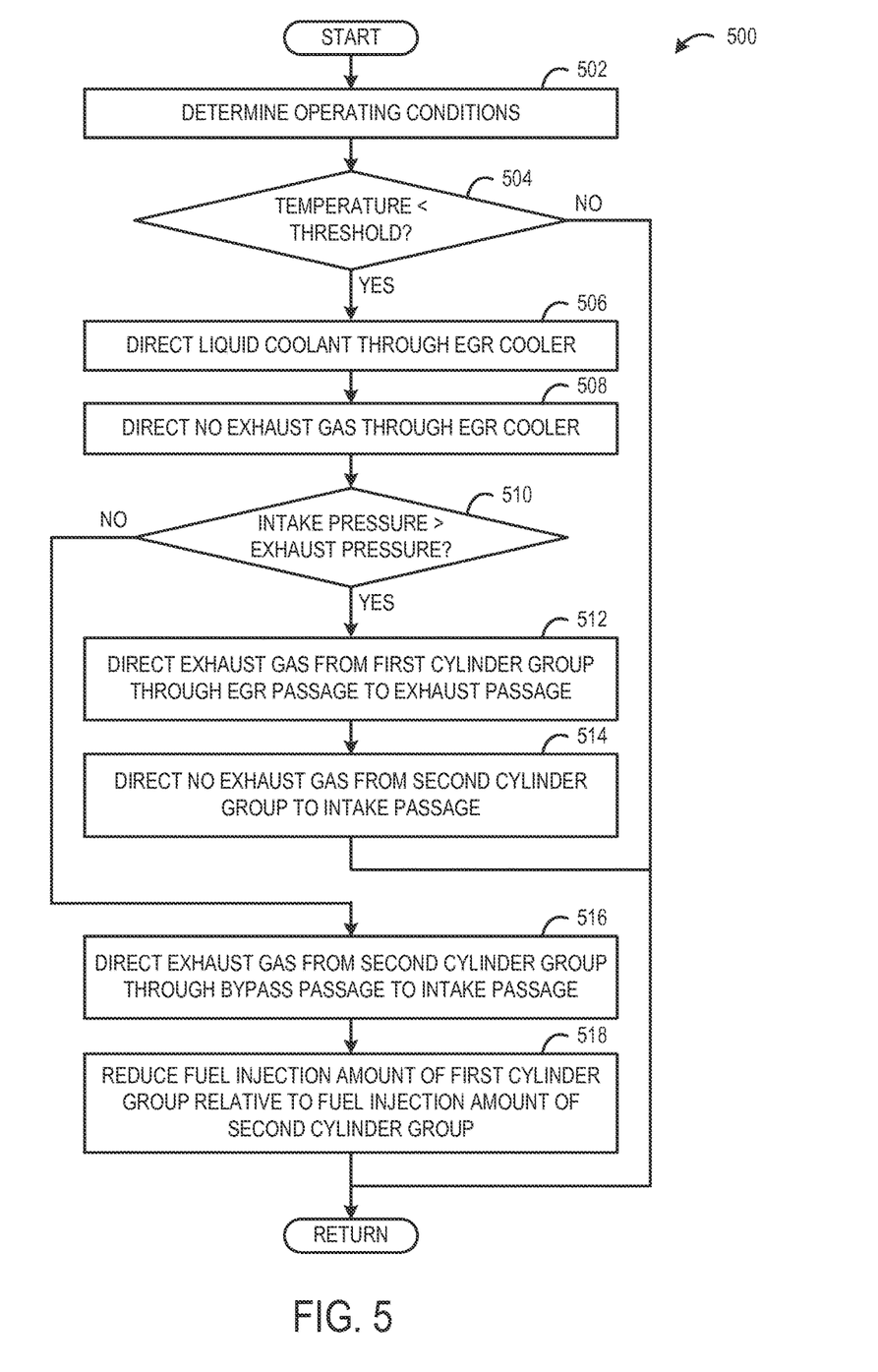
FIG. 5 shows a flow chart of another embodiment of a method for controlling EGR in an engine during various temperature conditions.

FIG. 5 shows a flow chart of another embodiment of a method 500 for controlling EGR in an engine during various temperature conditions. In one example, the method 500 is executed by the controller 132 in FIG. 1, the controller 254 in FIG. 2, or the controller 354 in FIG. 3. At 502, the method 500 includes determining operating conditions.

At 504, the method 500 includes determining whether a temperature is less than a threshold temperature value. In one example, the temperature is an engine temperature and the threshold temperature value ranges between 70-90° C. In another example, the temperature is an ambient temperature and the threshold temperature value ranges between –20-20° C. If the temperature is less than the threshold temperature value, then the method 500 moves to 506. Otherwise, the method 500 returns to other operations.

At 506, the method 500 includes directing liquid coolant through the EGR cooler.

At 508, the method 500 includes directing substantially no exhaust gas through the EGR cooler. In one example, substantially no exhaust gas includes a range of 0-10% of total EGR capability of the cylinders. For example, exhaust gas provided by a first cylinder group is directed through an EGR passage structure to an exhaust passage structure to bypass the EGR cooler.

By directing no exhaust gas through the EGR cooler while still directing liquid coolant through the EGR cooler at low temperatures, EGR cooler fouling is reduced or mitigated. Moreover, regeneration of the EGR cooler is promoted by thermally shocking the EGR cooler.

At 510, the method 500 includes determining whether intake pressure is greater than exhaust pressure. If intake pressure is greater than exhaust pressure, then the method 500 moves to 512. Otherwise, the method 500 moves to 516.

At 512, the method 500 directing exhaust gas from the first cylinder group through the EGR passage structure fluidly coupled between the first cylinder group and an intake passage structure.

At 514, the method 500 includes directing substantially no exhaust gas from a second cylinder group to the intake passage structure. For example, the second cylinder group provides exhaust gas to the exhaust manifold to be expelled to the atmosphere. In one example, the first cylinder group provides exhaust gas for EGR and the second cylinder group provides no exhaust gas for EGR.

At 516, the method 500 includes directing exhaust gas from the second cylinder group through a bypass passage structure fluidly coupled between the exhaust passage structure and the intake passage structure.

At 518, the method 500 includes reducing a fuel injection amount of the first cylinder group relative to a fuel injection amount of the second cylinder group. In one example, reducing the fuel injection amount of the first cylinder group includes injecting substantially no fuel into at least one cylinder of the first cylinder group. In another example, reducing the fuel injection amount of the first cylinder group includes injection substantially no fuel into all cylinders of the first cylinder group.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
during a first operating condition, directing exhaust gas from a first cylinder group of an engine into an engine air intake stream and directing substantially no exhaust gas from a second cylinder group of the engine to the engine air intake stream; and
during a second operating condition, directing exhaust gas from the second cylinder group through a bypass into the engine air intake stream and reducing a fuel injection amount of the first cylinder group relative to a fuel injection amount of the second cylinder group.

2. The method of claim 1, wherein the first operating condition includes an intake pressure being greater than an exhaust pressure and the second operating condition includes the intake pressure being less than the exhaust pressure, and wherein reducing a fuel injection amount of the first cylinder group relative to a fuel injection amount of the second cylinder group comprises injecting an amount of fuel into cylinders of the first cylinder group that is different than an amount of fuel injected into cylinders of the second cylinder group.

3. The method of claim 1, wherein the first operating condition includes an engine load being greater than a threshold load value and the second operating condition includes the engine load being less than the threshold load value.

4. The method of claim 1, wherein reducing the fuel injection amount of the first cylinder group includes injecting no fuel into at least one cylinder of the first cylinder group.

5. The method of claim 1, wherein the engine includes a turbocharger, and wherein the bypass is a turbocharger bypass, and the method further comprises:
during a third operating condition, accelerating the turbocharger by directing intake air into a stream of exhaust gas that powers the turbocharger.

6. The method of claim 1, wherein the engine includes an exhaust gas recirculation (EGR) cooler positioned in an EGR passage structure coupled to the first cylinder group, and the method further comprises:
during the second operating condition, directing liquid coolant through the EGR cooler, and directing substantially no exhaust gas through the EGR cooler.

7. The method of claim 6, wherein the second operating condition includes an ambient temperature or an engine temperature being less than a threshold temperature value.

8. A system comprising:
an engine;
a plurality of fuel injectors operable to inject fuel into a first cylinder group and a second cylinder group of the engine;
an intake passage structure coupled to the first cylinder group and the second cylinder group;
an EGR passage structure coupled between the first cylinder group and the intake passage structure, the first cylinder group providing exhaust gas exclusively to the intake passage structure;
an exhaust passage structure coupled to the second cylinder group;
a bypass passage structure coupled between the exhaust passage structure and the intake passage structure;
a bypass valve positioned in the bypass passage structure; and
a controller configured to respond to an intake pressure being less than an exhaust pressure, by adjusting the bypass valve to direct exhaust gas from the second cylinder group through the bypass passage structure to the intake passage structure.

9. The system of claim 8, wherein the controller is further configured to respond to the intake pressure being less than the exhaust pressure, by reducing a fuel injection amount of the first cylinder group relative to a fuel injection amount of the second cylinder group.

10. The system of claim 9, wherein reducing the fuel injection amount of the first cylinder group includes injecting no fuel into at least one cylinder of the first cylinder group.

11. The system of claim 8, wherein the controller is configured to respond to the intake pressure being greater than the exhaust pressure by directing exhaust gas from the first cylinder group through the EGR passage structure to the intake passage structure, and by adjusting the bypass valve to direct no exhaust gas from the second cylinder group to the intake passage structure, and wherein the first cylinder group is not directly fluidly coupled to the exhaust passage.

12. The system of claim 8, further comprising:
an EGR cooler positioned in the EGR passage structure, and wherein the controller is further configured to respond to the intake pressure being less than the exhaust pressure by directing liquid coolant through the EGR cooler and by directing substantially no exhaust gas through the EGR cooler.

13. The system of claim 8, further comprising:
a turbocharger, wherein the controller is configured to, during an operating condition, adjust the bypass valve to direct intake air from the intake passage structure through the bypass passage structure to the exhaust passage structure to accelerate the turbocharger.

14. The system of claim 8, wherein the EGR passage structure only receives exhaust from the second cylinder group and the exhaust passage structure only receives exhaust from the first cylinder group.

15. The system of claim 8, wherein the EGR passage structure is fluidly coupled to the exhaust passage structure, and the system further comprises:
an EGR bypass valve positioned in the EGR passage structure, wherein the EGR bypass valve is operable to control the flow of exhaust gas from the first cylinder group to the exhaust passage structure.

16. The system of claim 15, wherein the controller is further configured to respond to the intake pressure being less than the exhaust pressure, by adjusting the EGR bypass valve to direct exhaust gas from the first cylinder group through the EGR passage structure to the exhaust passage structure.

17. A method, comprising:
in response to an intake pressure being greater than an exhaust pressure, directing exhaust gas from a first cylinder group of an engine through an exhaust gas recirculation (EGR) passage structure fluidly coupled between the first cylinder group and an intake passage structure and directing substantially no exhaust gas from a second cylinder group of the engine to the intake passage structure; and
in response to the intake pressure being less than the exhaust pressure, directing exhaust gas from the second cylinder group through a bypass passage structure fluidly coupled between an exhaust passage structure and the intake passage structure and reducing a fuel injection amount of the first cylinder group relative to a fuel injection amount of the second cylinder group.

18. The method of claim 17, wherein the engine includes a turbocharger, and the method further comprises:
during an operating condition, directing intake air from the intake passage structure through the bypass passage structure to the exhaust passage structure to accelerate the turbocharger.

19. The method of claim 17, wherein the engine includes an EGR cooler positioned in the EGR passage structure, and the method further comprises:
in response to an ambient temperature or an engine temperature being less than a threshold temperature value and the intake pressure being less than the exhaust pressure, directing liquid coolant through the EGR cooler, and directing substantially no exhaust gas through the EGR cooler.

20. The method of claim 19, further comprising:
in response to the ambient temperature being less than the threshold temperature value and the intake pressure being less than the exhaust pressure, directing exhaust gas from the first cylinder group to the exhaust passage structure.

* * * * *